US011219836B2

(12) United States Patent
Nakajima et al.

(10) Patent No.: US 11,219,836 B2
(45) Date of Patent: Jan. 11, 2022

(54) INFORMATION PROCESSING PROGRAM, INFORMATION PROCESSING SYSTEM, AND SERVER FOR DISPLAYING PARAMETERS FOR A GAME BATTLE

(71) Applicant: CYGAMES, INC., Tokyo (JP)

(72) Inventors: Satoshi Nakajima, Tokyo (JP); Tetsuya Fukuhara, Tokyo (JP); Kunihiko Matsuda, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/857,684

(22) Filed: Apr. 24, 2020

(65) Prior Publication Data

US 2020/0246708 A1 Aug. 6, 2020

Related U.S. Application Data

(63) Continuation of application No. PCT/JP2018/039023, filed on Oct. 19, 2018.

(30) Foreign Application Priority Data

Oct. 27, 2017 (JP) .............................. JP2017-207871

(51) Int. Cl.
*A63F 13/822* (2014.01)
*A63F 13/58* (2014.01)

(52) U.S. Cl.
CPC ............ *A63F 13/822* (2014.09); *A63F 13/58* (2014.09); *A63F 2300/807* (2013.01)

(58) Field of Classification Search
CPC ...... A63F 13/822; A63F 13/58; A63F 13/537; A63F 2300/807
See application file for complete search history.

(56) References Cited

U.S. PATENT DOCUMENTS 6,336,861 B1 * 1/2002 Konoe .................... A63F 13/10
463/23
7,887,403 B2 * 2/2011 Kotani .................. A63F 13/537
463/8
(Continued)

FOREIGN PATENT DOCUMENTS

JP 2004-351229 A 12/2004
JP 2005-6992 A 1/2005
(Continued)

OTHER PUBLICATIONS

International Search Report issued in Application No. PCT/JP2018/039023, dated Dec. 11, 2018 (4 pages).
(Continued)

*Primary Examiner* — Chase E Leichliter
(74) *Attorney, Agent, or Firm* — Osha Bergman Watanabe & Burton LLP

(57) ABSTRACT

An information processing program causes a computer to execute control processing in which: when a battle by a first character group including a first character and a second character group including various second characters is started, control is executed so as to display display target parameters for the second characters on a display medium, and a first number, which is the number of the second characters, is stored; a second number, which is the number of second characters determined as participating in the battle on the basis of determination parameters, which are parameters for determining whether or not to permit participation in the battle, is stored in iterative processing that is iterated during the battle; the display mode of the display target parameters on the display medium is changed in accordance with a condition regarding at least one of the first number and the second number in the iterative processing.

9 Claims, 12 Drawing Sheets

(56) References Cited

U.S. PATENT DOCUMENTS

| | | | | |
|---|---|---|---|---|
| 8,105,162 | B2* | 1/2012 | Uchibori | A63F 13/10 463/31 |
| 10,463,966 | B2* | 11/2019 | Fujiwara | A63F 13/56 |
| 2004/0209684 | A1* | 10/2004 | Hisano | A63F 13/5258 463/32 |
| 2005/0054402 | A1* | 3/2005 | Noguchi | A63F 13/10 463/5 |
| 2007/0026944 | A1* | 2/2007 | Maehiro | A63F 13/822 463/31 |
| 2007/0076015 | A1* | 4/2007 | Tanabe | A63F 13/822 345/619 |
| 2008/0119268 | A1* | 5/2008 | Kando | A63F 13/00 463/31 |
| 2008/0211686 | A1* | 9/2008 | Arai | G06F 3/0481 340/815.4 |
| 2008/0254849 | A1* | 10/2008 | Nomura | A63F 13/44 463/16 |
| 2009/0102975 | A1* | 4/2009 | Arai | A63F 13/10 348/589 |
| 2009/0305758 | A1* | 12/2009 | Nomura | A63F 13/822 463/7 |
| 2011/0124415 | A1* | 5/2011 | Shimono | A63F 13/795 463/42 |
| 2013/0165194 | A1* | 6/2013 | Nojiri | A63F 13/53 463/5 |
| 2013/0288789 | A1* | 10/2013 | Shikata | A63F 13/26 463/31 |
| 2018/0161674 | A1* | 6/2018 | Kohara | A63F 13/92 |

FOREIGN PATENT DOCUMENTS

| | | |
|---|---|---|
| JP | 2005-34208 A | 2/2005 |
| JP | 2008-73254 A | 4/2008 |
| JP | 2015-54220 A | 3/2015 |
| JP | 2016-135212 A | 7/2016 |

OTHER PUBLICATIONS

Written Opinion issued in International Application No. PCT/JP2018/039023, dated Dec. 11, 2018 (4 pages).

Notification of Reasons for Refusal issued in Japanese Application No. 2017-207871, dated Dec. 19, 2017 (2 pages).

* cited by examiner

INFORMATION PROCESSING PROGRAM, INFORMATION PROCESSING SYSTEM, AND SERVER FOR DISPLAYING PARAMETERS FOR A GAME BATTLE

TECHNICAL FIELD

The present invention relates to information processing programs, information processing systems, and servers.

BACKGROUND ART

Conventionally, in a game in which a battle is played between ally characters operated by a player and enemy characters, it is generally practiced to display parameters for characters participating in the battle. For example, in a battle screen of a turn-taking role-playing game (RPG), displaying the current status of enemy characters and ally characters, such as hit points (HPs), is something that is practiced.

As specific examples, FIG. 51 in Patent Literature 1 and FIG. 3 in Patent Literature 2 disclose simultaneously displaying parameters for a plurality of enemy characters and individual parameters of a plurality of ally characters.

CITATION LIST

Patent Literature

Japanese Unexamined Patent Application, Publication No. 2005-6992
Japanese Unexamined Patent Application, Publication No. 2015-54220

DISCLOSURE OF THE INVENTION

Problems to be Solved by the Invention

With the display based on the ordinary technologies disclosed in the abovementioned Patent Literature 1 and Patent Literature 2, etc., a player can proceed with a game while checking parameters for each character participating in a battle. Meanwhile, with such ordinary technologies, because of the limited display area, it is necessary to display parameters for each character in a small size in the case where a plurality of characters exist.

However, there has been a problem that the visibility of parameter display is compromised when parameters for each character are displayed in a small size.

The present invention has been made in view of the situation described above, and it is an object thereof to more suitably display parameters for each character during a battle.

Means for Solving the Problems

In order to achieve the above object, an information processing program according to an aspect of the present invention causes a computer to execute control processing including:

a preprocessing step of executing control, when a battle by a first character group including at least one first character and a second character group including a plurality of second characters is started, so as to display display target parameters for the second characters on a display medium, and storing a first number, which is the number of the second characters;

a first step of storing a second number, which is the number of second characters determined as participating in the battle on the basis of determination parameters, which are parameters for determining whether or not to permit participation in the battle, in iterative processing that is iterated during the battle;

a second step of causing at least one of the first character group and the second character group to take an action in accordance with an action instruction input by a player or a predetermined condition in the iterative processing;

a third step of changing the determination parameters in accordance with individual actions of the characters in the iterative processing;

a fourth step of executing control so as to display, on the display medium, display target parameters for second characters determined as participating in the battle on the basis of the determination parameters in the iterative processing; and a fifth step of executing control so as to change the display mode of the display target parameters on the display medium in accordance with a condition regarding at least one of the first number and the second number in the iterative processing, wherein the iterative processing is continued by iteratively performing the first step to the fifth step in a predetermined order until the determination parameter for each character included in the first character group or each character included in the second character group satisfies a predetermined condition, and the iterative processing is terminated when the predetermined condition is satisfied.

Effects of the Invention

The present invention makes it possible to more suitably display parameters for each character during a battle.

PREFERRED MODE FOR CARRYING OUT THE INVENTION

Now, embodiments of the present invention will be described with reference to the drawings.

In the embodiments of the present invention, when a plurality of character groups are engaged in a battle against each other, the parameter display mode for each character is changed in accordance with increases and decreases in the number of characters in the battle included in at least one of the character groups.

Accordingly, in the embodiments of the present invention, parameters for each character during a battle can be displayed more suitably compared with ordinary technologies, which do not involve such changes in the display mode.

Hereinafter, three embodiments, namely, a first embodiment, a second embodiment, and a third embodiment, will be described as the embodiments of the present invention.

Here, the first embodiment is an embodiment in which the abovementioned changes in the parameter display mode are realized by an independent information processing device, without requiring communication with other devices.

Meanwhile, the second embodiment and the third embodiment are embodiments in which the abovementioned changes in the parameter display mode are realized by what is called a client-server system, in which a player terminal acting as a client cooperates with a server. Note that the distribution of functions between the player terminal and the server differs between the second embodiment and the third embodiment.

These embodiments will be described below individually in detail.

First Embodiment

[Hardware Configuration]

Figure 1:
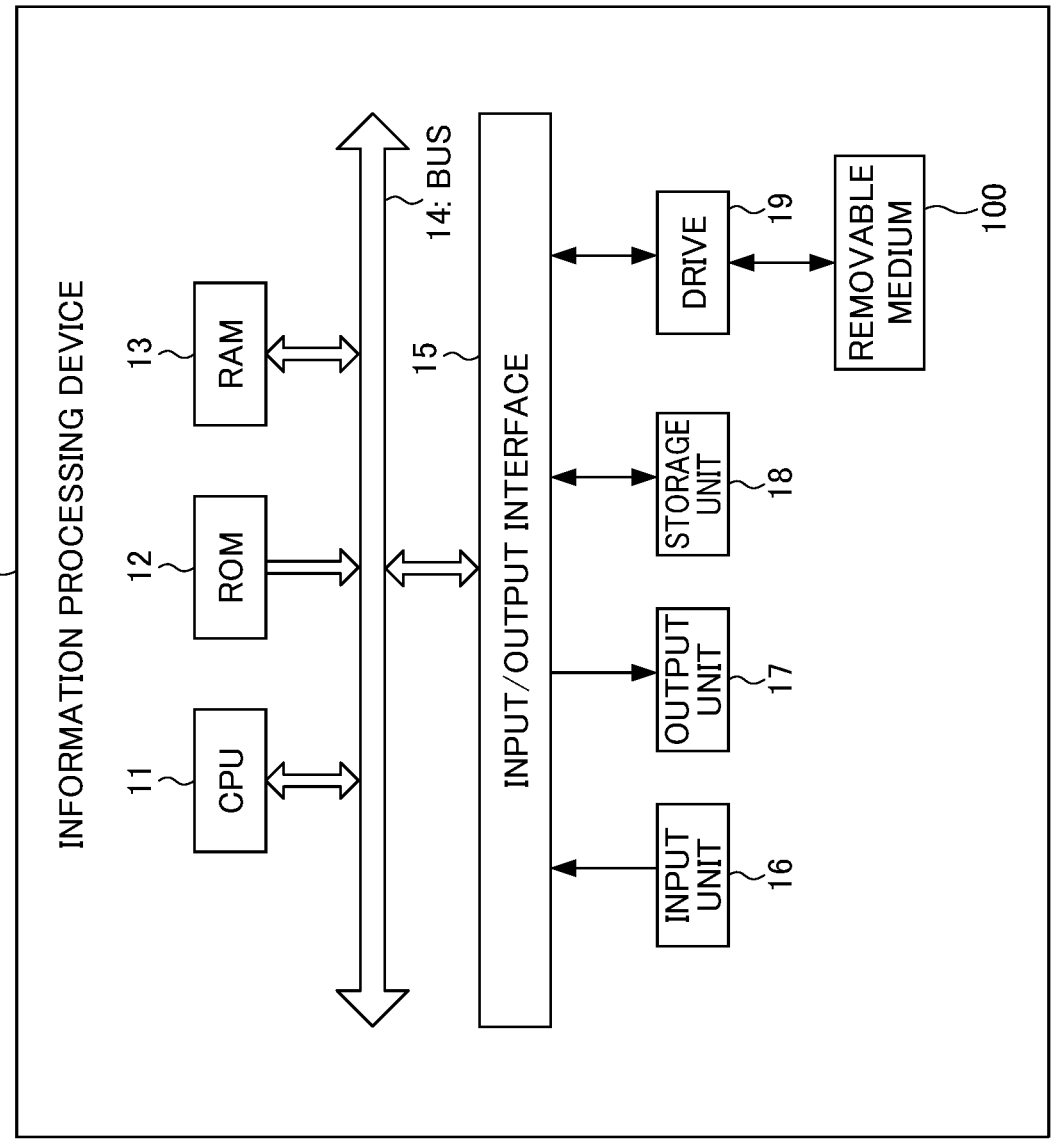
FIG. 1 is a block diagram showing the hardware configuration of an information processing device according to a first embodiment of the present invention.

First, the configuration of the hardware in the first embodiment will be described below with reference to FIG. 1. FIG. 1 is a block diagram showing the hardware configuration of an information processing device 1 according to the first embodiment of the present invention.

For example, the information processing device 1 is configured as a game machine or a personal computer.

As shown in FIG. 1, the information processing device 1 includes a central processing unit (CPU) 11, a read only memory (ROM) 12, a random access memory (RAM) 13, a bus 14, an input/output interface 15, an input unit 16, an output unit 17, a storage unit 18, and a drive 19.

The CPU 11 executes various kinds of processing according to programs recorded in the ROM 12 or programs loaded from the storage unit 18 into the RAM 13.

The RAM 13 also stores, as appropriate, data, etc. needed for the execution of various kinds of processing by the CPU 11.

The CPU 11, the ROM 12, and the RAM 13 are connected to each other via the bus 14. The input/output interface 15 is also connected to the bus 14. The input unit 16, the output unit 17, the storage unit 18, and the drive 19 are connected to the input/output interface 15.

The input unit 16 is constituted of various buttons, a touchscreen, a microphone, or the like, and allows the input of various kinds of information in response to instruction operations by a player. Alternatively, the input unit 16 may be realized by a controller that is independent of a main unit accommodating the other units of the information processing device 1. Furthermore, the configuration may be such that the input unit 16 and the main unit perform wired or wireless communication via a communication unit, which is not shown, whereby the operations by the player are accepted by the main unit.

The output unit 17 is a unit that outputs image data or audio data to a display, a speaker, or the like. The image data or audio data output from the output unit 17 is output from the display, the speaker, or the like in a form that can be recognized by the player as an image or audio.

Alternatively, for example, in the case where the information processing device 1 is configured as a portable game machine, the display or the speaker may be realized in a form integrated with the information processing device 1.

The storage unit 18 is constituted of a semiconductor memory, such as a dynamic random access memory (DRAM), and stores various kinds of data.

The drive 19 is provided as needed and as appropriate. A removable medium 100, formed of a magnetic disk, an optical disk, a magneto-optical disk, a semiconductor memory, or the like, is loaded in the drive 19 as appropriate. The removable medium 100 stores a program for executing a game and various kinds of data such as image data. The program and the various kinds of data such as image data, read from the removable medium 100 by the drive 19, are installed in the storage unit 18 as needed.

[Functional Configuration]

Figure 2:
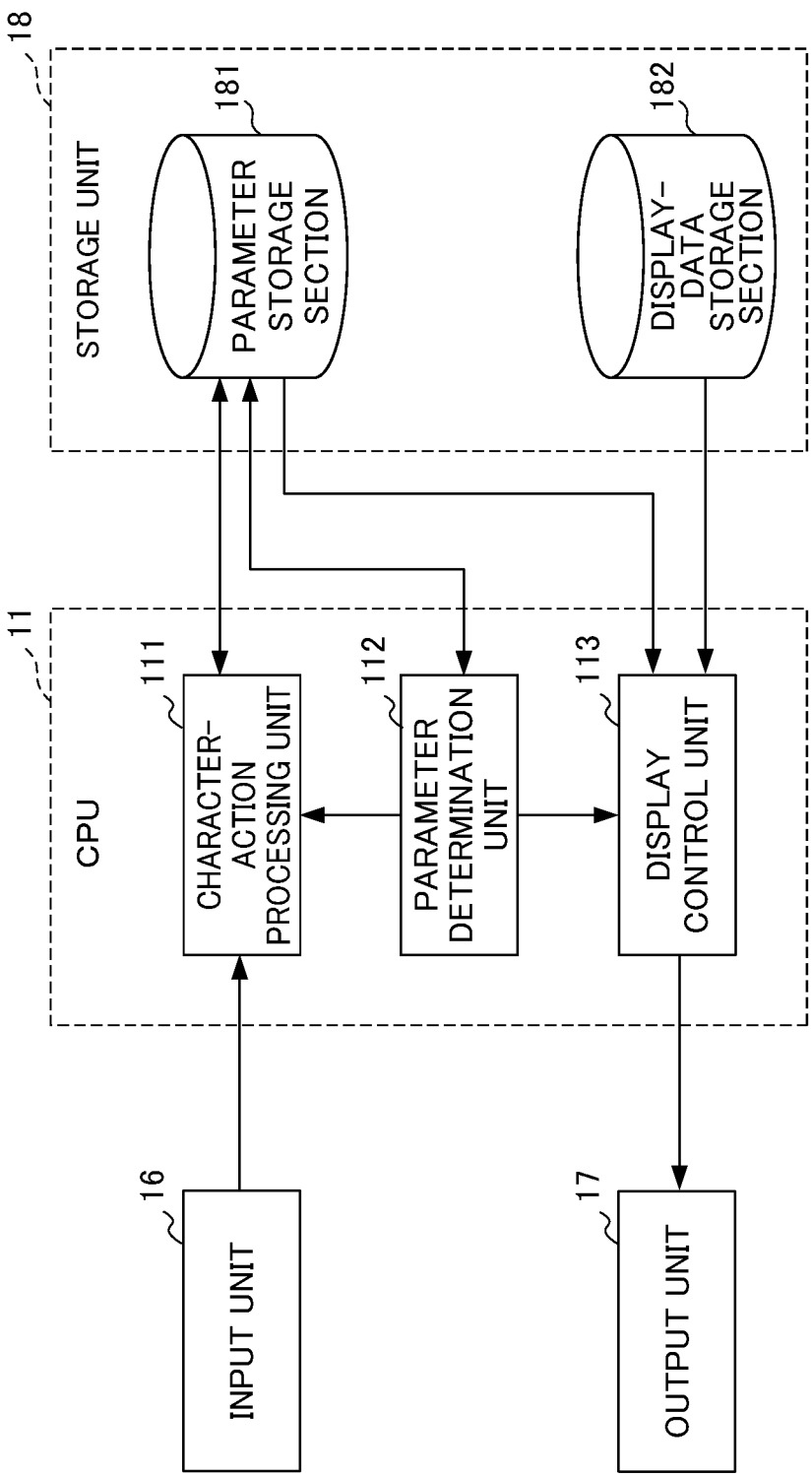
FIG. 2 is a functional block diagram showing the functional configuration for executing a battle execution process in the first embodiment in the functional configuration of the information processing device in FIG. 1.

FIG. 2 is a functional block diagram showing the functional configuration for executing a battle execution process in the functional configuration of the information processing device 1 in FIG. 1.

The battle execution process refers to a series of processing steps including a processing step for changing the parameter display mode for each character when a plurality of character groups are engaged in a battle against each other, in accordance with increases and decreases in the number of characters in the battle included in at least one of the character groups.

When the battle execution processing is executed, the CPU 11 functions as a character-action processing unit 111, a parameter determination unit 112, and a display control unit 113, as shown in FIG. 2.

Furthermore, a parameter storage section 181 and a display-data storage section 182 are set in an area of the storage unit 18.

The character-action processing unit 111 is a unit that executes processing for causing ally characters and enemy characters to take actions, where the ally characters are characters that are operated by the player, and the enemy characters are characters that battle against the ally characters. The following description will be given in the context of an example where a plurality of characters are included in the ally characters and also a plurality of characters are included in the enemy characters. In this description, the plurality of ally characters will be collectively referred to, as appropriate, as an "ally character group". Similarly, the plurality of enemy characters will be collectively referred to, as appropriate, as an "enemy character group". Furthermore, the ally characters and the enemy characters will be referred to as "characters" when no distinction is made therebetween.

The character-action processing unit 111 causes the ally characters to take actions in accordance with the content of an action instruction based on a player's operation input from the input unit 16, as well as predetermined conditions. Furthermore, the character-action processing unit 111 causes the enemy characters to take actions alternately with the ally characters.

A character action refers to, for example, an action involving processing with which a certain character affects another character. An example of a character action is an action in which the characters in one of the character groups attack the characters in the other character group, thereby decreasing the hit points or involving a predetermined status abnormality for the characters in the other character group.

Another example of a character action is an action in which a character in one of the character groups performs a recovery action on the character group to which the character belongs, thereby recovering the hit points or recovering from the predetermined status abnormality for the characters in the character group to which the character belongs.

Here, in the following description, the hit points refers to a parameter for determining whether or not to permit participation in a battle, and a character is prohibited from participating in the battle when the hit points for that character become a predetermined value (e.g., less than or equal to zero). Hit points refer to a "determination parameter" in the present invention.

Furthermore, the predetermined status abnormality is invoked, for example, when the value of a parameter relating to the predetermined status abnormality for each character is changed. For a character for which the status abnormality has been invoked, for example, processing for limiting actions by the character or processing for temporarily increasing or decreasing a parameter indicating the defensive ability of the character is executed.

Note that these character actions are only examples, and character actions may be changed, as appropriate, in accordance with the rules of a game to which this embodiment is applied. As an example, when in a predetermined state, a character in one of the character groups may attack the character group to which the character belongs, or a character in one of the character groups may take a recovery action for a character in the other character group. As another example, when the hit points for a certain character become a predetermined value (e.g., less than or equal to zero), this character may be permitted to participate in the battle again by taking a recovery action.

The character-action processing unit 111 reads the parameters associated with each character, stored in the parameter storage section 181, and causes the character to take an action, as described above. Furthermore, the character-action processing unit 111 changes the parameters for each character in accordance with the result of an action by that character. Furthermore, the character-action processing unit 111 updates the parameters for each character, stored in the parameter storage section 181, to the latest values on the basis of the changed parameters.

In the following description, hit points is mainly used as an example of a parameter for each character. However, the character-action processing unit 111 also changes parameters other than the hit points (e.g., a parameter for using magic, such as magic points, or a parameter for a character to invoke a predetermined special action (skill)), in accordance with character actions. Furthermore, the character-action processing unit 111 also stores these other parameters in the parameter storage section 181. Furthermore, the character-action processing unit 111 also changes these other parameters, as appropriate, to the latest values in accordance with the actions of each character.

The parameter determination unit 112 is a unit that performs determination based on a parameter. The parameter determination unit 112 performs determination on the basis of the value of the hit points, which is one of the parameters. Then, on the basis of the result of the determination, the parameter determination unit 112 issues an instruction for changing the parameter display mode or an instruction for terminating the battle. The determination performed by the parameter determination unit 112 will be described later with reference to a flowchart in FIG. 3.

The display control unit 113 is a unit that executes control for performing battle-related display on the basis of the latest parameters updated by the character-action processing unit 111, stored in the parameter storage section 181, and the display data stored in the display-data storage section 182. Executing control for performing battle-related display refers to, for example, executing control processing for outputting image data for performing display from the output unit 17 and for displaying an image on a display or the like connected to the output unit 17.

The display control unit 113 executes control, for example, to display an image and/or text indicating each character engaged in the battle, an image and/or text indicating the parameters for each character, an image and/or text indicating the action status of each character, an image (e.g., an image indicating a value of damage given to the character) and/or text indicating changes in the parameters associated with an action by each character, and an image and/or text indicating various kinds of effects or the like. Specific examples of display by the display control unit 113 will be described later with reference to FIG. 4, etc. The parameters displayed as an image correspond to "display target parameters" in the present invention. That is, in this embodiment, the hit points value, which is a determination parameter, is displayed as at least one of the display target parameters.

The parameter storage section 181 is a section where parameters for each character, such as the hit points and the magic points, are stored, as described earlier. These parameters are updated to the latest values by the character-action processing unit 111, as described earlier.

Furthermore, the parameter storage section 181 also stores parameters indicating the abilities of each character. Examples of the parameters indicating the abilities of each character include parameters indicating the attack ability, defense ability, etc. of each character and parameters indicating magic and skills available for each character. The character-action processing calculates the result of an action by each character on the basis of these parameters indicating the abilities of that character, as well as a predetermined formula. For example, the character-action processing unit 111 calculates the value of damage or the like given by an attack on the basis of the parameters indicating the abilities of each character, as well as the predetermined formula.

The display-data storage section 182 is a section where image data for performing display by the display control unit 113, data indicating the position where the image data is to be laid out, etc. are stored. Although the image data for performing display by the display control unit 113 may be stored only in the display-data storage section 182, the image data may be read, as appropriate, from the removable medium 100 by the drive 19.

[Operation]

The functional blocks for executing the battle execution process have been described above. Next, the battle execution process executed by these functional blocks will be described with reference to FIG. 4.

Figure 4:
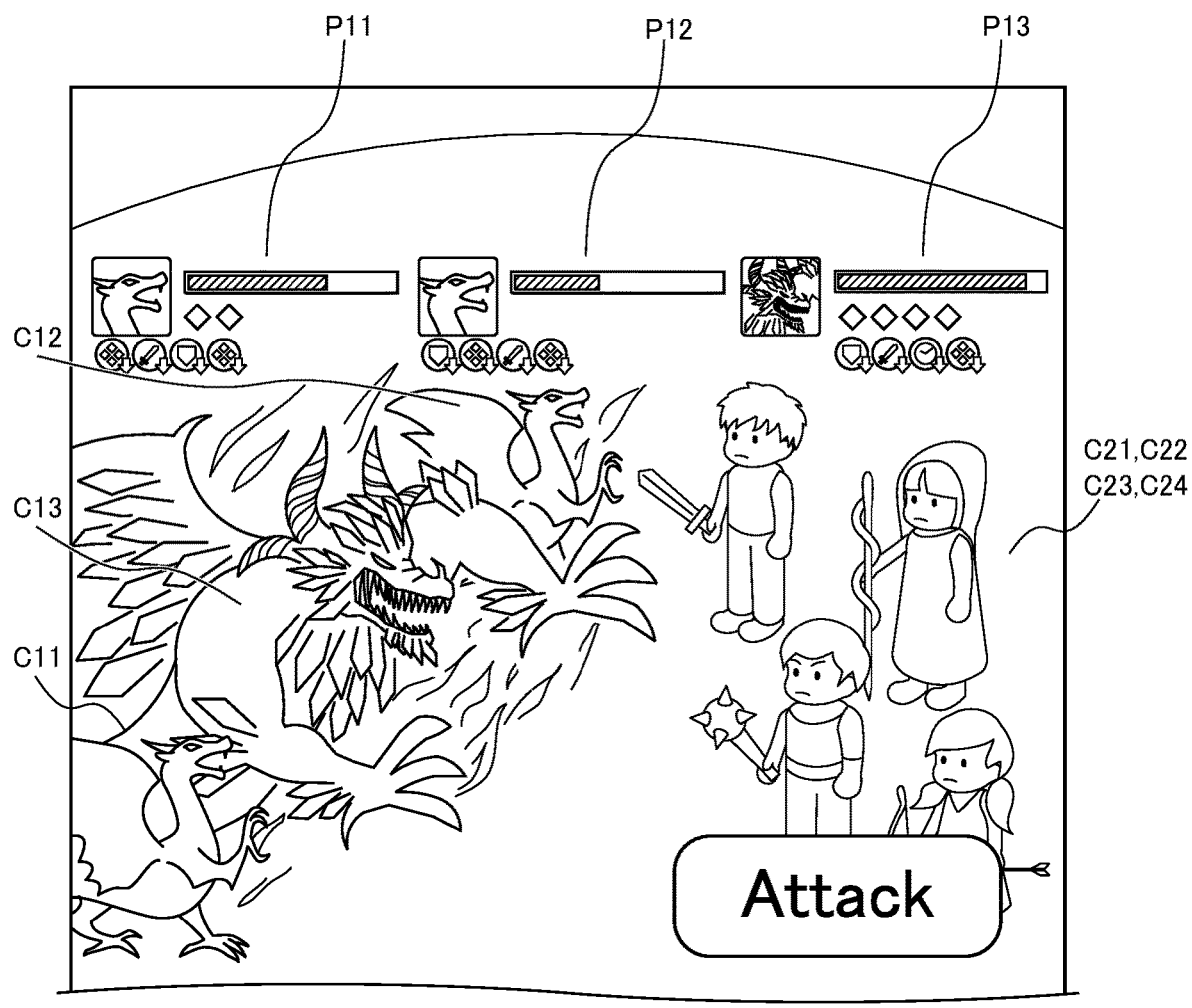
FIG. 4 is a schematic illustration showing a display example that is displayed in the battle execution process that is executed by the information processing device in FIG. 1, having the functional configuration in FIG. 2.

FIG. 4 is a flowchart for explaining the flow of the battle execution process executed by the information processing device 1 in FIG. 1, which has the functional configuration in FIG. 2. The battle execution process is executed when a battle is played between enemy characters and ally characters in a game executed on the information processing device 1. It is assumed that the battle is played between an ally character group including at least one ally character and an enemy character group including a plurality of enemy characters.

In step S11, the parameter determination unit 112 stores a first number, which is the number of enemy characters participating in the battle.

In step S12, the display control unit 113 executes control to display images indicating the individual characters participating in the battle and the parameters for the individual characters on the display connected to the output unit 17. The processing in step S11 above and this step S12 corresponds to "preprocessing" in the present invention. Furthermore, the processing in the following step S13 to step S19 corresponds to "iterative processing" in the present invention.

In step S13, in iterative processing that is iterated during the battle, the parameter determination unit 112 stores a second number, which is the number of enemy characters determined on the basis of the hit points as participating in the battle.

In step S14, the character-action processing unit 111 causes an ally character to take an action in accordance with an action instruction input by the player via the input unit 16 or in accordance with a predetermined condition. Furthermore, the character-action processing unit 111 causes the enemy characters to take actions mutually with the ally characters. In step S14, there may be cases, depending on the situation in the game, where only either the ally characters or the enemy characters take actions instead of the ally characters and the enemy characters mutually taking actions.

In step S15, the character-action processing unit 111 changes the parameters for the individual characters, including the hit points, in accordance with the individual actions of the characters. Furthermore, the character-action processing unit 111 updates the parameters stored in the parameter storage section 181 to the latest values on the basis of the changed parameters.

In step S16, the display control unit 113 executes control to display images indicating the individual characters determined as participating in the battle on the basis of the hit points changed in step S15, as well as the parameters for the individual characters, on the display connected to the output unit 17.

In step S17, the parameter determination unit 112 determines whether or not a battle termination condition is satisfied. As an example, the battle termination condition is satisfied when the hit points of each of the characters included in the ally character group or the hit points of each of the characters included in the enemy character group has become a predetermined value (e.g., less than or equal to zero) and thus there is no character that can participate in the battle in one of the character groups. As another example, the battle termination condition may be satisfied when a predetermined time has elapsed since the start of the battle execution process.

As yet another example, the battle termination condition may be satisfied when the player has issued a predetermined action instruction (e.g., an instruction for fleeing from the battle). In this case, the battle termination condition may be satisfied when the player has issued the predetermined action instruction (e.g., an instruction for fleeing from the battle) and the predetermined action (e.g., fleeing from the battle) is successful.

In the case where the battle termination condition is satisfied, the determination in step S17 results in Yes, and the battle execution process is terminated. Meanwhile, in the case where the battle termination condition is not satisfied, the determination in step S17 results in No, and the process proceeds to step S18.

In step S18, the parameter determination unit 112 determines whether or not a condition regarding at least one of the first number and the second number (hereinafter referred to as a "number-of-characters condition"), which is a condition for determining whether or not to change the display mode, is satisfied.

The number-of-characters condition may be defined arbitrarily; for example, the number-of-characters condition may be one of the following three conditions or a combination of these conditions.

First condition: A change is detected as a result of comparing the first number with the number of enemy characters determined as participating in the battle on the basis of the hit points changed in step S15.

Second condition: A change is detected as a result of comparing the second number with the number of enemy characters determined as participating in the battle on the basis of the hit points changed in step S15.

Third condition: The number of enemy characters determined as participating in the battle on the basis of the hit points changed in step S15 is a predetermined number.

In the case where the number-of-characters condition is satisfied, the determination in step S18 results in Yes, and the process proceeds to step S19. Meanwhile, in the case where the number-of-characters condition is not satisfied, the determination in step S18 results in No, and the process proceeds to step S13. Then, the processing in and after step S13, which is iterative processing, is iterated again.

In step S19, the display control unit 113 changes the display mode of the parameters, such as the hit points, displayed on the display connected to the output unit 17. Specific examples of changes in the display mode will be described next with reference to FIG. 4 and other figures. Then, the process proceeds to step S13. Then, the processing in and after step S13, which is iterative processing, is iterated again.

With the battle execution process described above, according to this embodiment, when a plurality of character groups are engaged in a battle against each other, the parameter display mode for each character is changed in accordance with increases and decreases in the number of characters in the battle included in at least one of the character groups.

Therefore, in the embodiment of the present invention, parameters for each character during a battle can be displayed more suitably compared with ordinary technologies, which do not involve such changes in the display mode.

[Specific Examples of Changes in Display Mode]

Next, changes in the display mode in this embodiment will be described with reference to FIGS. 4 and 5. Here, FIGS. 4 and 5 are illustrations showing examples of a screen that is displayed on the display connected to the output unit 17 under the control of the display control unit 113 in this embodiment.

First, FIG. 4 shows an example of a screen before the display mode is changed. As shown in FIG. 4, a character C11, a character C12, and a character C13, which are enemy characters, are displayed on the left side of the screen. Meanwhile, a character C21, a character C22, a character C23, and a character C24, which are ally characters, are displayed on the right side of the screen. Furthermore, parameters for the individual enemy characters are displayed in an upper portion of the screen. Specifically, parameters P11, which are parameters for the character C11, parameters P12, which are parameters for the character C12, and parameters P13, which are parameters for the character C13, are displayed.

As described above, in this embodiment, since the parameters for the individual enemy characters are displayed, the player can proceed with the battle while determining the actions, etc. of the ally characters with reference to the parameters. Now, suppose that the number of enemy characters participating in the battle decreases in the course of the battle, whereby the number-of-characters condition is satisfied. Then, as described earlier, the parameter determination unit 112 issues an instruction to the display control unit 113 so as to change the display mode. Then, the display control unit 113 changes the display mode according to this instruction.

Figure 5:
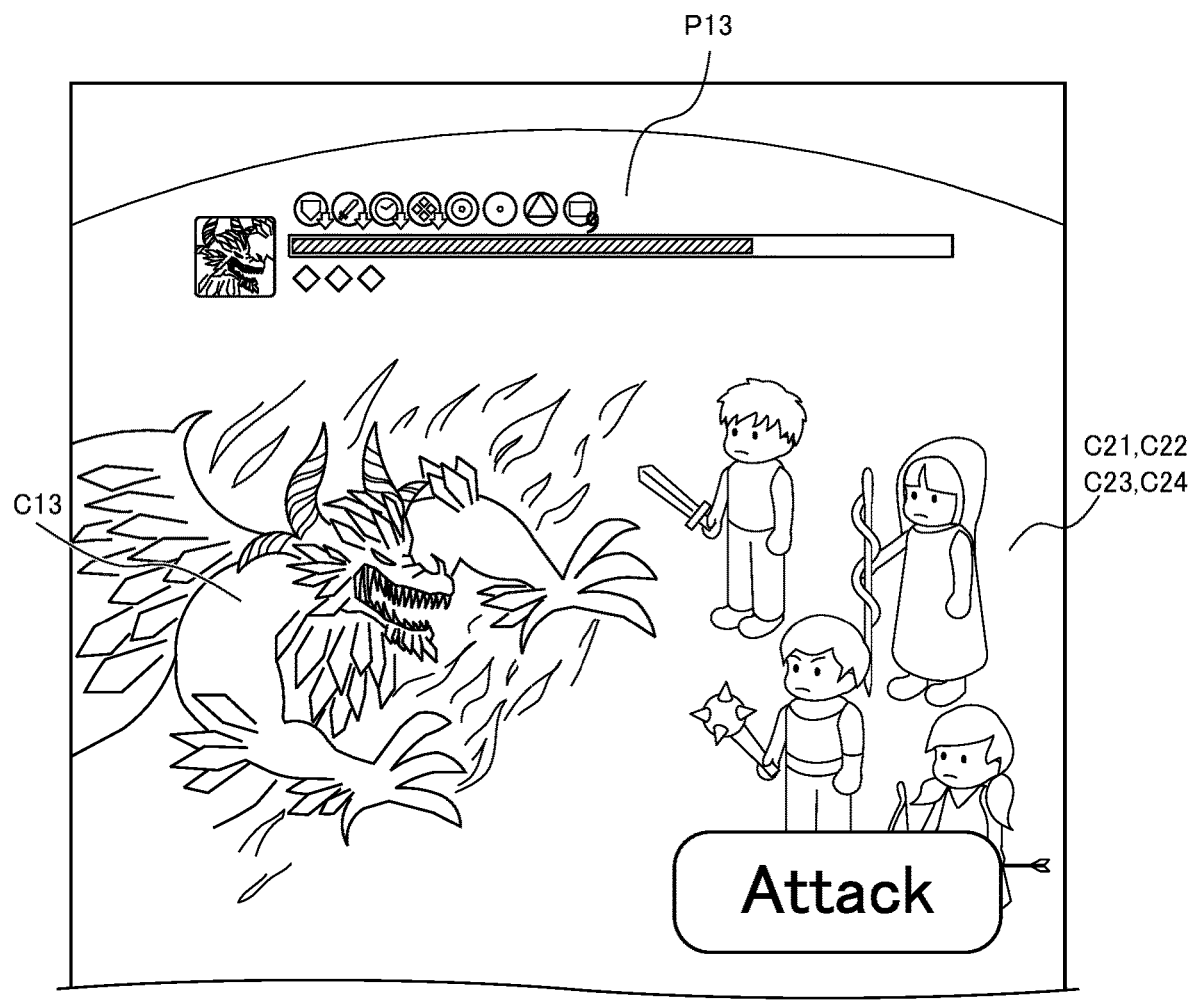
FIG. 5 is a schematic illustration showing another display example that is displayed in the battle execution process that is executed by the information processing device in FIG. 1, having the functional configuration in FIG. 2.

FIG. 5 shows a display example after the display mode is changed.

In this example, it is assumed that the hit points of the character C11 and the character C12, which are enemy characters, have become a predetermined value (e.g., less than or equal to zero), whereby the characters C11 and C12 are prohibited from participating in the battle. In this case, in this embodiment, the display mode is changed so as to increase the size of the area for displaying the parameters P13, which are parameters for the character C13, whereby the parameters 13 are displayed in a larger size compared with the example in FIG. 4. This allows the player to view the parameters P13 more easily.

Accordingly, in the embodiment of the present invention, parameters for each character during a battle can be displayed more suitably compared with ordinary technologies, which do not involve such changes in the display mode.

As methods for realizing such changes in the display mode, for example, two methods are conceivable.

In a first method, a display material used to display a parameter (e.g., an image corresponding to a parameter) is switched from a first display material, which is currently being used, to a second display material, which has a size different from the first display material when displayed. With this first method, since there is no need to perform processing such as expanding the image, it is possible to display a parameter in the form of an image having high resolution. Furthermore, with this first method, for example, in the case where a plurality of kinds of parameters are displayed, it is possible to vary the layout of the plurality of parameters before and after changing the display mode. Furthermore, with this first method, it is also possible to change the design for displaying a parameter. For example, it is possible to change to a display design in which a line (what is called a scale) indicating the midpoint in a parameter gauge is added.

In a second method, a display material used to display a parameter is subjected to enlargement processing or reduction processing. With this second method, since there is no need to prepare a plurality of display materials, it is possible to reduce the amount of image data.

Note that changing the display mode so as to display a parameter in a larger size is just an example of changing the display mode, and it is also possible to change the display mode by using other methods. This will be described later with reference to FIG. 7.

[Effects of Changes in Display Mode]

Next, the effects attained with changes in the display mode according to the embodiment described above, as compared with ordinary technologies, will be described.

Figure 6:
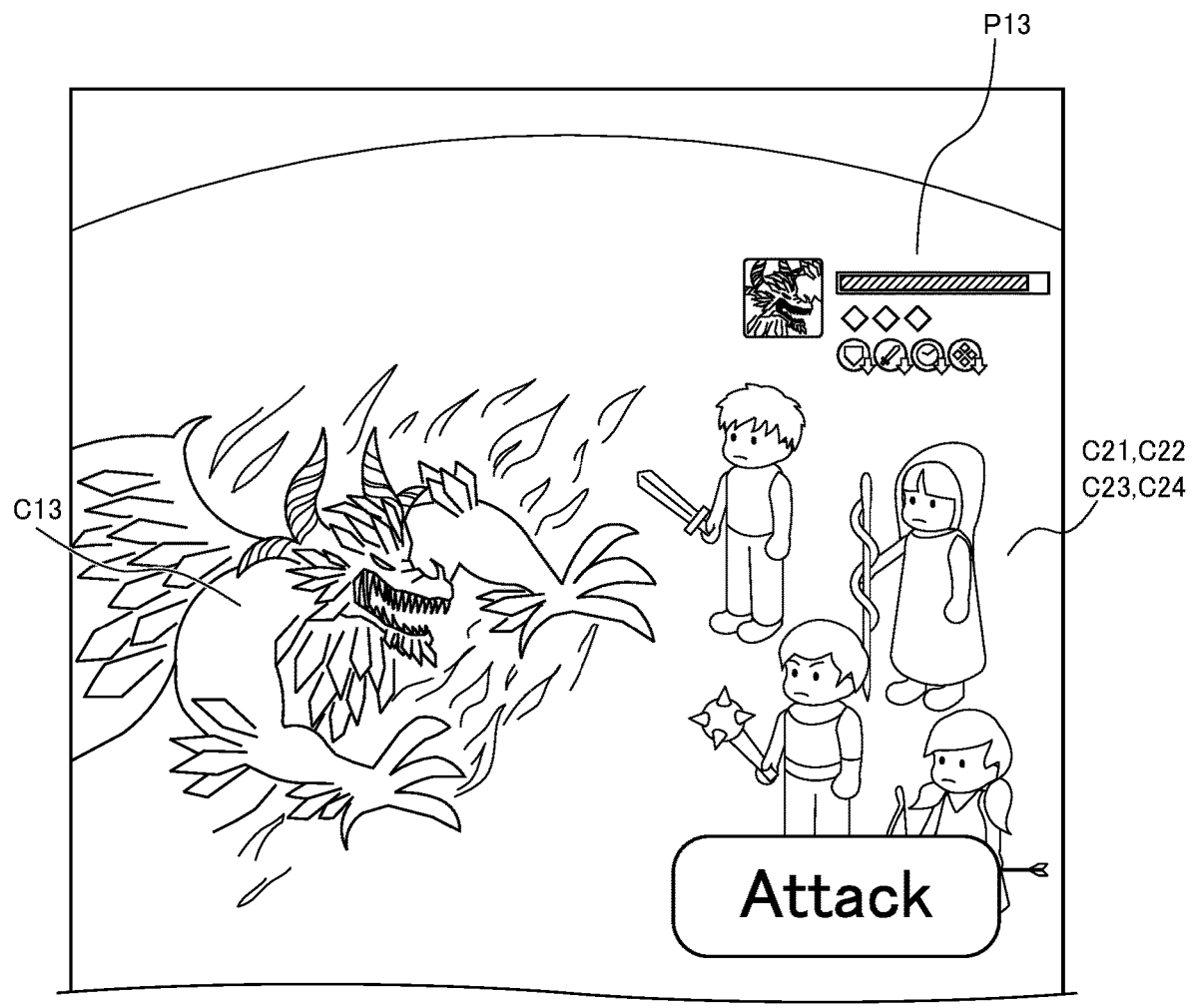
FIG. 6 is a schematic illustration showing a display example in a battle execution process in an ordinary technology.

First, FIG. 6 shows a display example in an ordinary technology. In the example in FIG. 6, similarly to FIG. 5, it is assumed that the hit points of the character C11 and the character C12, which are enemy characters, have become a predetermined value (e.g., less than or equal to zero) from the state in FIG. 4, whereby the characters C11 and C12 are prohibited from participating in the battle.

In this case, in the ordinary technology, the display mode is not changed in particular, and the parameters P13, which are parameters for the character C13, are displayed similarly to the example in FIG. 4. Thus, the visibility of the parameters P13 is lower compared with the display example in FIG. 5.

In contrast, in this embodiment, it is possible to improve the visibility for the user by changing the display mode, as described earlier. That is, this embodiment exhibits an advantageous effect compared with the ordinary technology.

Figure 7:
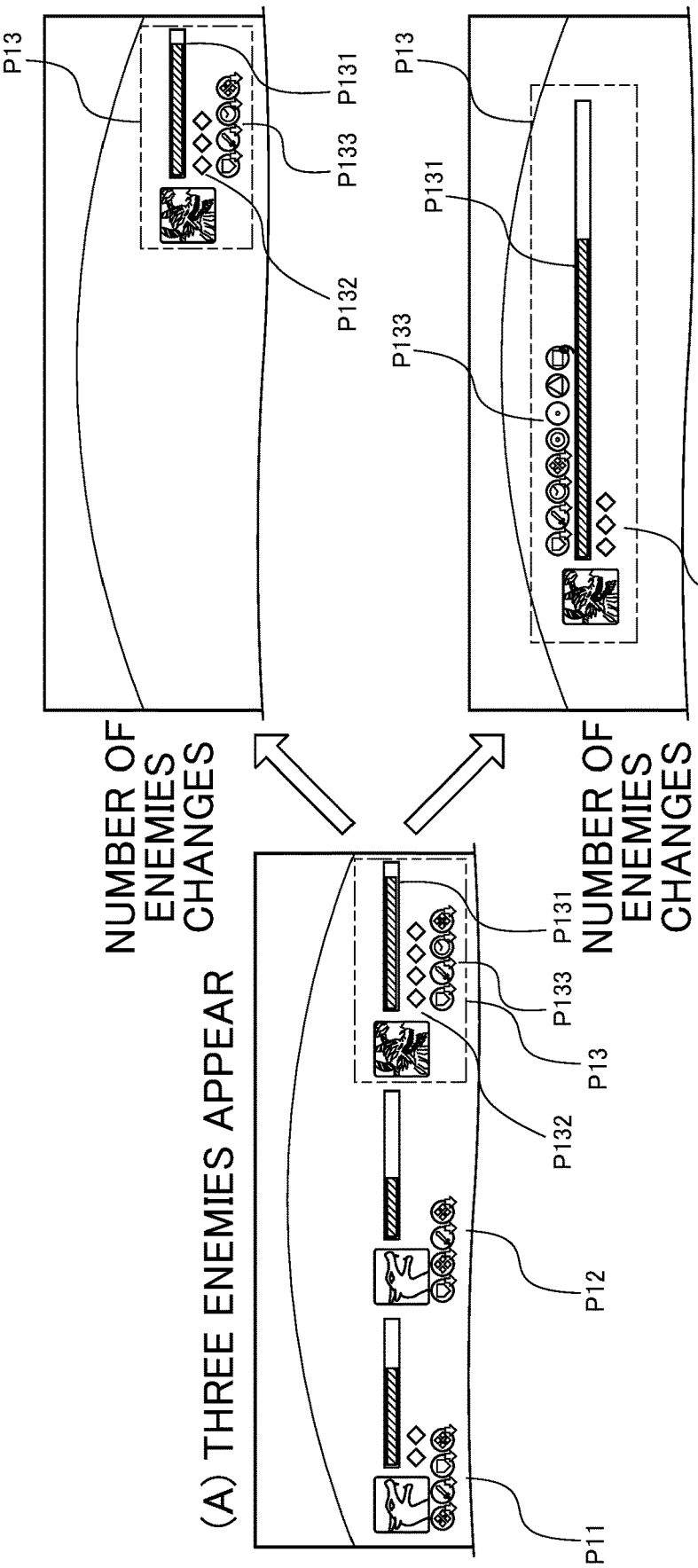
FIG. 7 is a schematic illustration for comparing the examples of display in the first embodiment of the present invention and the display example in the battle execution process in the ordinary technology.

Next, changes in the display mode according to this embodiment will be described in more detail with reference to FIG. 7. Part (A) in FIG. 7 shows an example of parameter display when three enemies appear and a battle is started. That is, part (A) in FIG. 7 shows an example of parameter display before changing the display mode. The following description will be given by using the parameters P13, which are parameters for the character C13, as an example in particular.

In this example, together with an image of the character C13, a parameter P131, a parameter P132, and a parameter P133 are displayed as the parameters P13. Here, the parameter P131 indicates the hit points of the character C13. Furthermore, the parameter P132 indicates the time before the character C13 is attacked. Furthermore, the parameter P133 indicates a status abnormality of the character C13.

Now, suppose that the number-of-characters condition in this embodiment is satisfied as a result of a change in the number of enemies. In this case, in the ordinary technology, a determination based on the number-of-characters conditions or a change in the display mode is not performed. Thus, as shown in part (B) in FIG. 7, the display mode of the parameters P13 is not changed, and the parameter P131, the parameter P132, and the parameter 133 are displayed similarly to part (A) in FIG. 7.

In contrast, in this embodiment, the display mode is changed, as shown in part (C) in FIG. 7. Specifically, as described earlier, the parameter P131 is displayed in a larger size by increasing the size of the parameter display area and replacing or otherwise changing the display material. Furthermore, in this example, the layout of the parameters is also changed so as to move the parameter P133 from below the parameter P132 to above the parameter P131.

Furthermore, although the number of icons that can be displayed as the parameters P133 is four at most because of the limited display area in part (A) in FIG. 7, the number of icons that can be displayed is increased by increasing the size of the display area when changing the display mode. For example, in the example in part (C) in FIG. 7, eight icons are displayed. A greater number of icons may be displayed in the case where the character C13 has more status abnormalities. By changing the display mode as described above, it also becomes possible to increase the amount of information that is displayed, as well as improving visibility.

Alternatively, as a change in the display mode, the kinds of parameters that are displayed may be increased, as well as increasing the number of items (e.g., icons) that are displayed for a certain kind of parameter (e.g., the parameter P133). For example, although three kinds of parameters, namely, the parameter P131, the parameter P132, and the parameter P133 are displayed because of the limited display area in Part (A) in FIG. 7, the size of the display area may be increased when changing the display mode so that a new parameter (e.g., a parameter P134) that is not displayed in part (A) in FIG. 7 can be displayed.

As described above, in this embodiment, as changes in the display mode, it is possible to make various changes in the size, layout, kinds, and number, as well as combinations thereof, etc. about parameter display.

Although the above description has been made in the context of an example where the display mode is changed from that in part (A) in FIG. 7 to that in part (C) in FIG. 7, i.e., an example in which the size of parameter display is increased or the number of icons is increased, the display mode may be changed from the display state in part (C) in FIG. 7 to that in part (A) in FIG. 7. That is, the size of parameter display may be decreased or the number of icons may be decreased in accordance with the content of the number-of-characters condition that is satisfied.

Second Embodiment

Next, a second embodiment of the present invention will be described. This embodiment is realized in the form of a client-server system in which the functionality of the information processing device 1 in the first embodiment is realized in a form distributed to a player terminal 2 and a server 3.

In the description of the second embodiment and the following description of a third embodiment, repeated descriptions of parts that are common to those in the first embodiment described above will be omitted as appropriate, and parts that differ from those in the first embodiment described above will be described in detail.

[Hardware Configuration]

Figure 8:
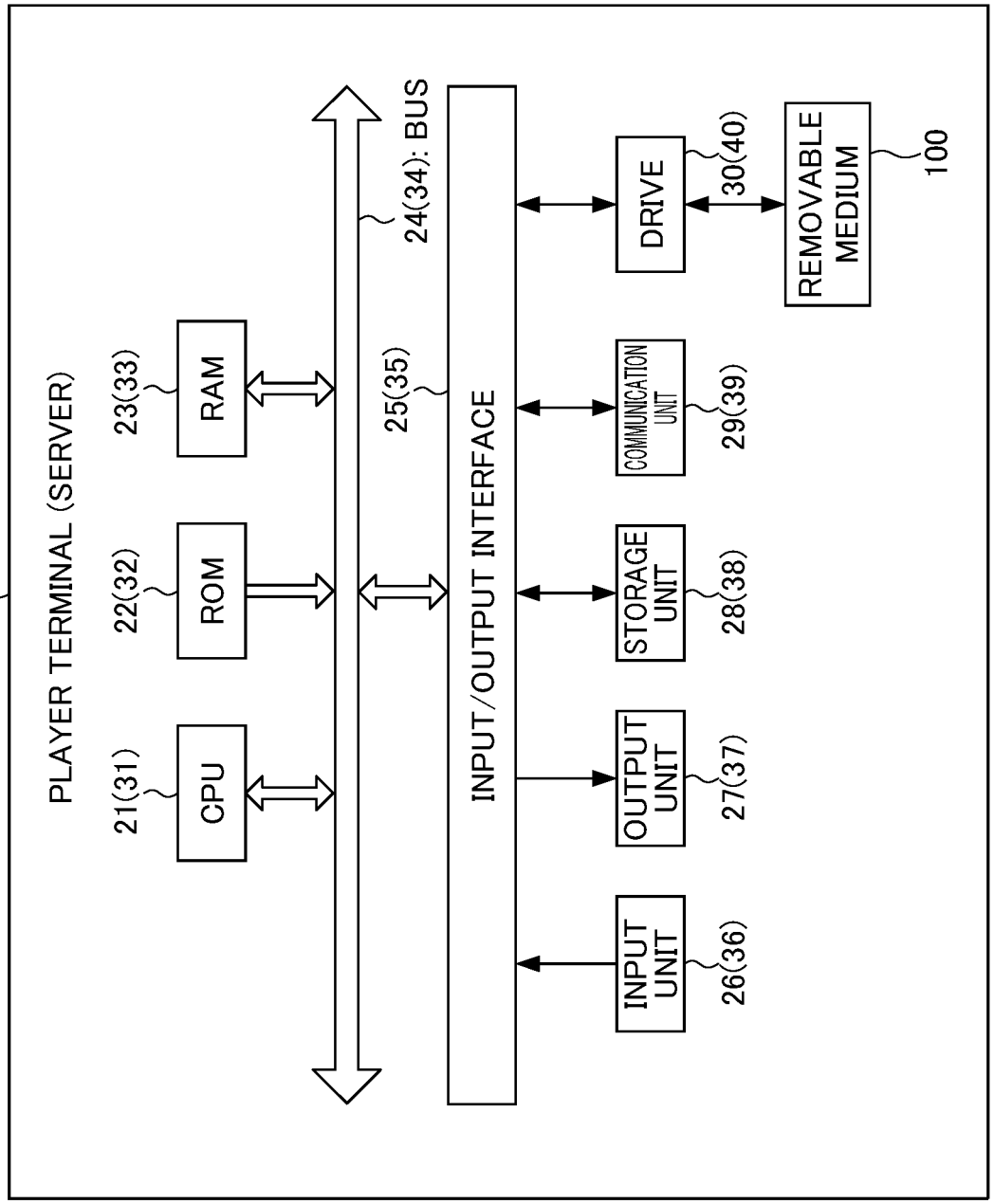
FIG. 8 is a block diagram showing the hardware configuration of a player terminal and a server according to a second embodiment and a third embodiment of the present invention.

First, the configuration of the hardware in the second embodiment will be described with reference to FIG. 8. FIG. 8 is a block diagram showing the hardware configuration of the player terminal 2 and the server 3 according to the second embodiment of the present invention. In this figure, reference signs corresponding to the player terminal 2 are given without parentheses attached thereto, and reference signs corresponding to the server 3 are given with parentheses attached thereto.

Here, for example, the player terminal 2 is configured as a smartphone, a game machine, or a personal computer, and the server 3 is configured as a server device.

As shown in FIG. 8, the player terminal 2 includes a CPU 21, a ROM 22, a RAM 23, a bus 24, an input/output interface 25, an input unit 26, an output unit 27, a storage unit 28, a communication unit 29, and a drive 30.

Furthermore, the server 3 includes a CPU 31, a ROM 32, a RAM 33, a bus 34, an input/output interface 35, an input unit 36, an output unit 37, a storage unit 38, a communication unit 39, and a drive 40.

These units have functions that are equivalent to the functions of the individual units having the same names with different reference signs, included in the information processing device 1 described with reference to FIG. 1, and thus, repeated descriptions thereof will be omitted.

Meanwhile, the communication unit 29 and the communication unit 39 control communication carried out with other devices via a network such as the Internet. For example, the player terminal 2 and the server 3 carry out communication with each other by using the communication unit 29 and the communication unit 39.

The hardware configuration of the player terminal 2 and the server 3 according to the second embodiment has been described above. Although not shown, in this embodiment, a plurality of player terminals 2 may exist, and the plurality of player terminals 2 may be connected to the single server 3. That is, the relationship between the player terminal 2 and the server 3 may be one to one or many to one. Alternatively, in the case where the functionality of the server 3 is provided in a form distributed to a plurality of server devices, the relationship between the player terminal 2 and the server 3 may be one to many or many to many.

[Functional Configuration]

Figure 9:
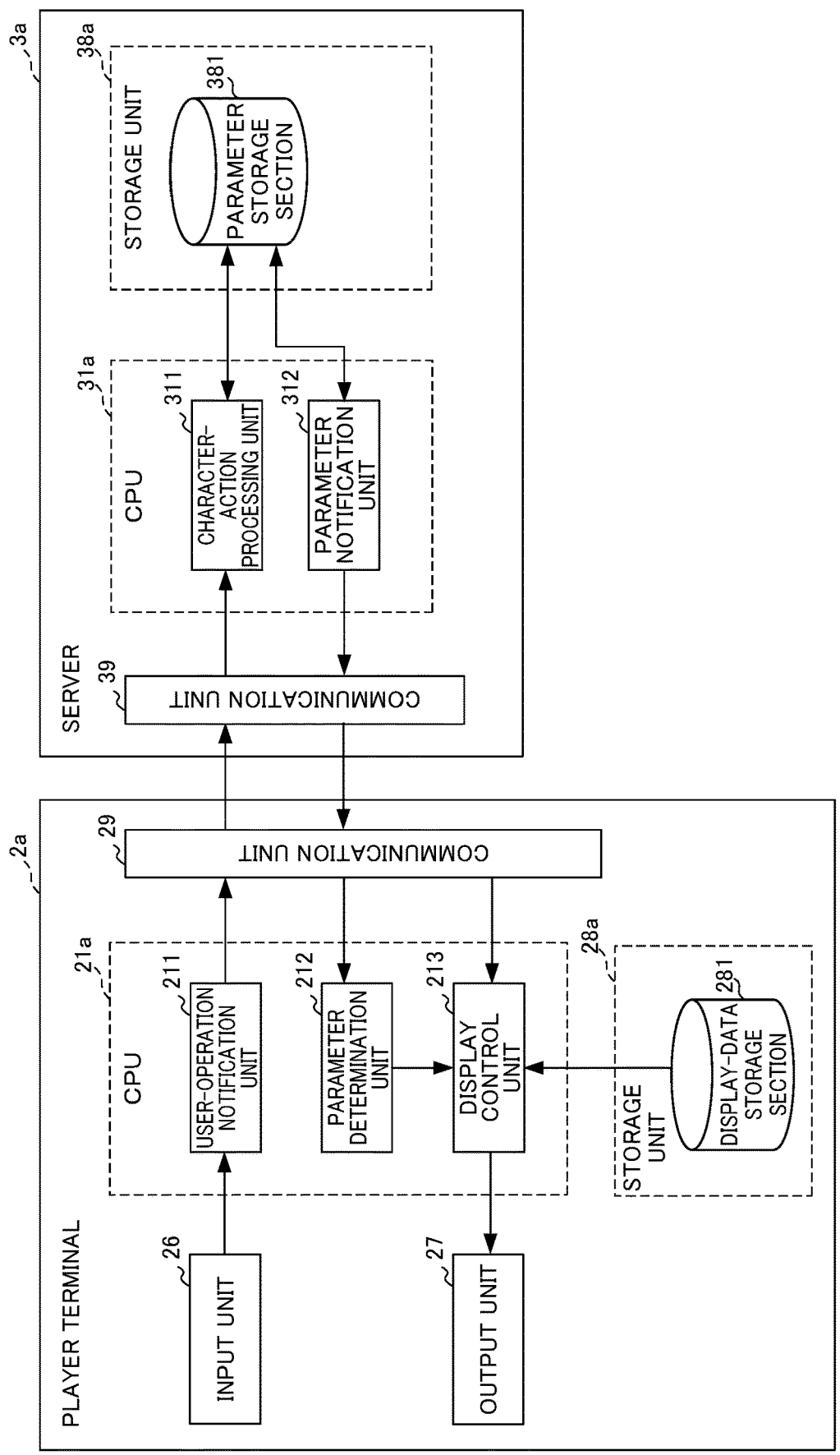
FIG. 9 is a functional block diagram showing the functional configuration for executing a battle execution process in the second embodiment in the functional configuration of the player terminal and the server in FIG. 8.

FIG. 9 is a functional block diagram showing the functional configuration for executing a battle execution process in the functional configuration of the player terminal 2 and the server 3 in FIG. 8. Note that the second embodiment and the third embodiment have the same hardware configuration, but the functional configuration varies between the second embodiment and the third embodiment. Thus, the second embodiment will be described with "a" appended to each reference sign, like the player terminal 2a, the CPU 21a, the storage unit 28a, the server 3a, the CPU 31a, and the storage unit 38a. In contrast, the third embodiment will be described with "b" appended to each reference sign, like the player terminal 2b, the CPU 21b, the storage unit 28b, the server 3b, the CPU 31b, and the storage unit 38b, as distinguished from the second embodiment.

When the battle execution process is executed, as shown in FIG. 9, the CPU 21a functions as a player-operation notification unit 211, a parameter determination unit 212, and a display control unit 213. Furthermore, a display-data storage section 281 is set in an area of the storage unit 28.

Furthermore, the CPU 31a functions as a character-operation processing unit 311 and a parameter notification unit 312. Furthermore, a parameter storage section 381 is set in an area of the storage unit 38a.

Here, the functional blocks other than the player-operation notification unit 211 and the parameter notification unit 312, as well as the individual storage units, have functions that are equivalent to the functions of the functional blocks having the same names with different reference signs, included in the information processing device 1 described with reference to FIG. 2, and thus, repeated descriptions thereof will be omitted.

The player-operation notification unit 211 is a unit that sends an operation instruction input by the player via the input unit 26 to the character-operation processing unit 311 of the server 3a via the communication unit 29.

Furthermore, the parameter notification unit 312 is a unit that sends the latest values of parameters stored in the parameter storage section 381 to the parameter determination unit 212 and the display control unit 213 of the player terminal 2a via the communication unit 39.

[Operation]

Next, a battle execution process that is executed by these functional blocks will be described with reference to FIG. 10.

Figure 10:
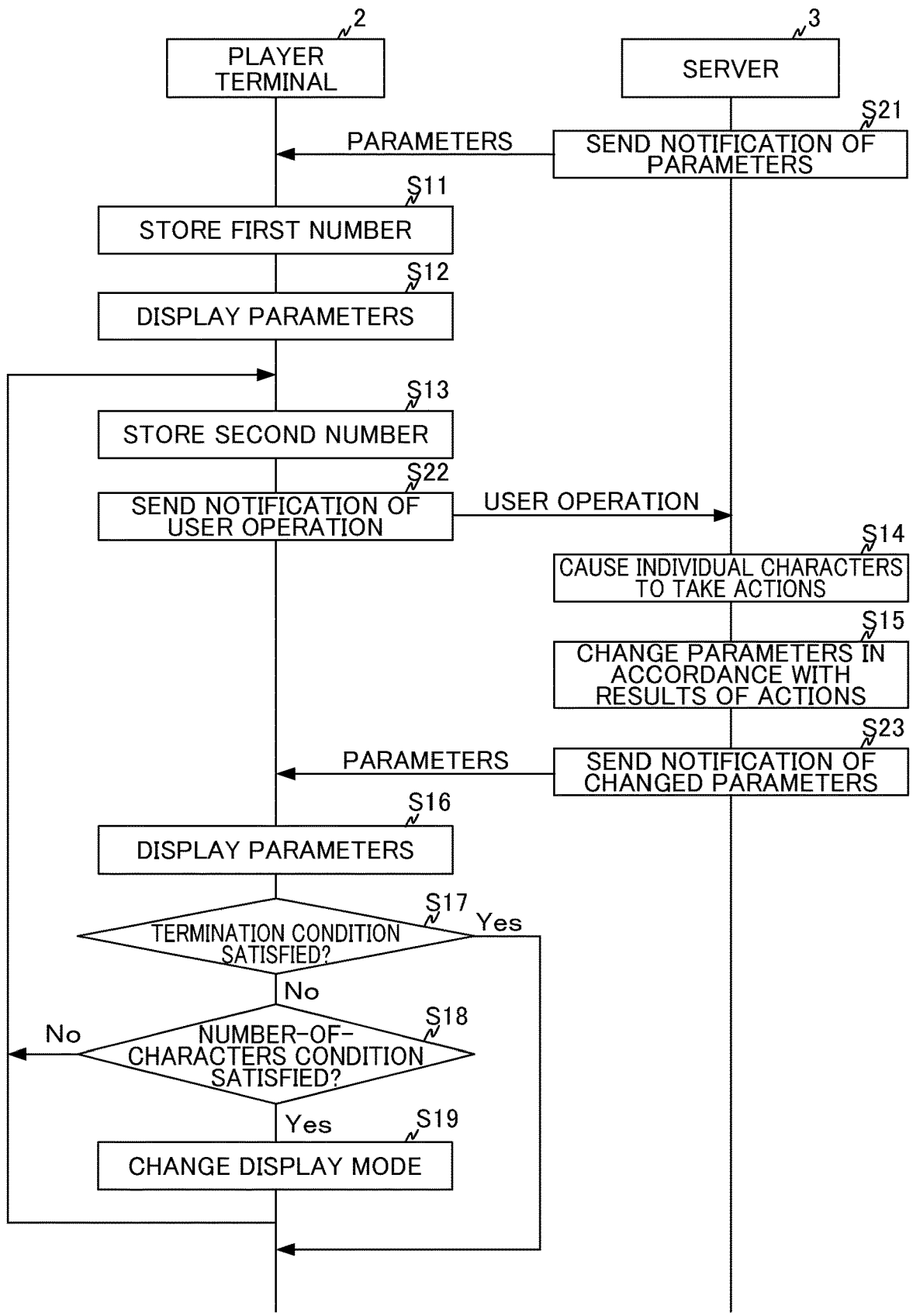
FIG. 10 is a sequence chart for explaining the flow of the battle execution process in the second embodiment, which is executed by the player terminal and the server in FIG. 8, having the functional configuration in FIG. 9.

FIG. 10 is a flowchart for explaining the flow of the battle execution process that is executed by the player terminal 2a and the server 3a in FIG. 8, having the functional configuration in FIG. 9. The battle execution process is executed when a battle is played between enemy characters and ally characters in a game that is executed on the player terminal 2a and the server 3a. It is assumed that the battle is played between an ally character group including at least one ally character and an enemy character group including a plurality of enemy characters.

Figure 3:
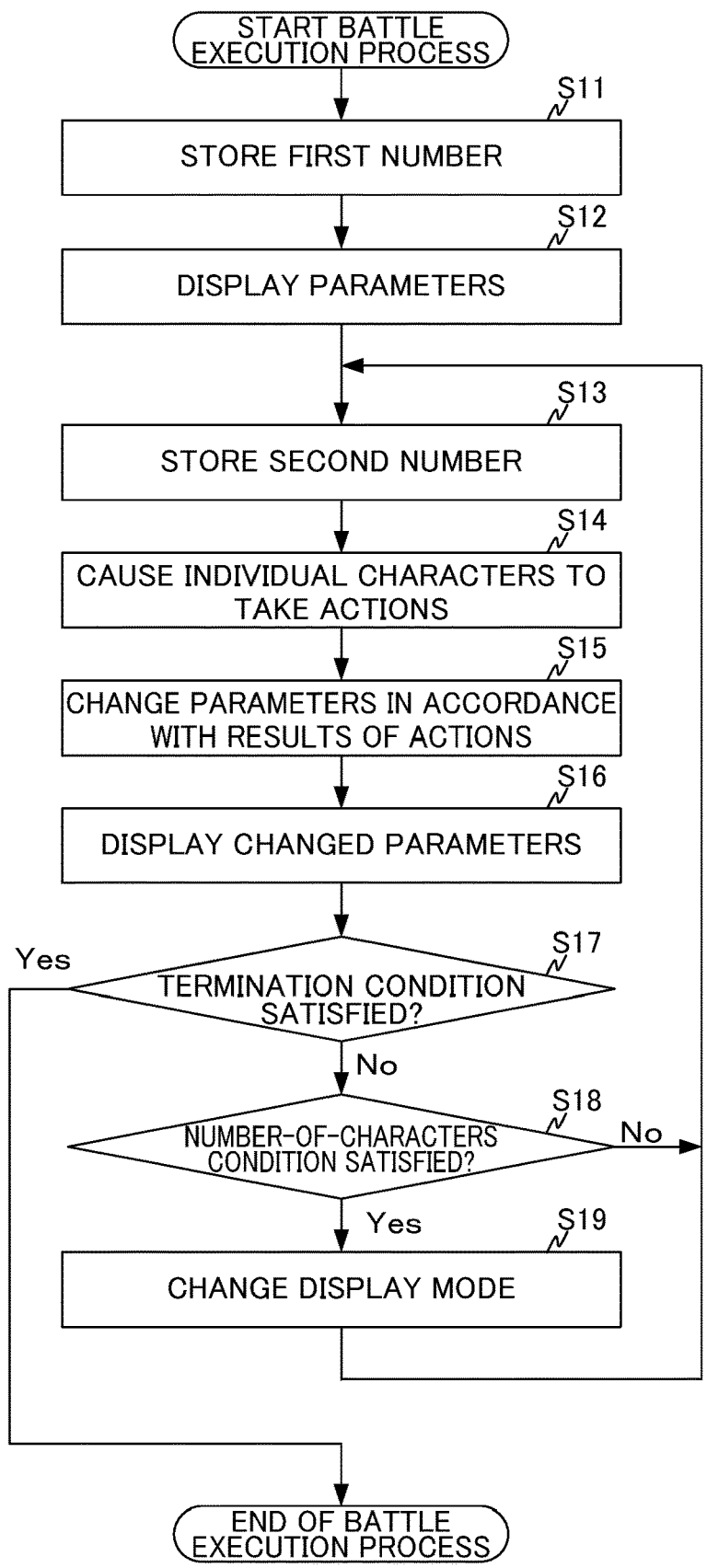
FIG. 3 is a flowchart for explaining the flow of the battle execution process that is executed by the information processing device in FIG. 1, having the functional configuration in FIG. 2.

In FIG. 10, steps having the same content as those in the flowchart in FIG. 3 are designated by the same reference signs (e.g., "S1"). Furthermore, repeated descriptions of the steps having the same content as those in the flowchart in FIG. 3 will be omitted to simplify the description.

In step S21, the parameter notification unit 312 sends the latest values of the parameters stored in the parameter storage section 381 to the player terminal 2a via the communication unit 39.

In step S11, the parameter determination unit 212 stores a first number.

In step S21, the display control unit 213 executes control to display images of the individual characters participating in the battle and the parameters for the individual characters.

In step S13, the parameter determination unit 212 stores a second number.

In step S22, the player-operation notification unit 211 sends an operation instruction input by the player via the input unit 26 to the server 3a via the communication unit 29.

In step S14, the character-action processing unit 311 causes an ally character to take an action in accordance with the action instruction received from the player terminal 2a or a predetermined condition. Furthermore, the character-action processing unit 311 causes the enemy characters to take actions mutually with the ally characters.

In step S15, the character-action processing unit 311 changes the parameters for the individual characters, including the hit points, in accordance with the individual actions of the characters. Furthermore, the character-action processing unit 311 updates the parameters stored in the parameter storage section 381 to the latest values on the basis of the changed parameters.

In step S23, the parameter notification unit 312 sends the latest values of the parameters stored in the parameter storage section 381, changed in step S15, to the player terminal 2a via the communication unit 39.

In step S16, display control unit 213 executes control to display, on the display connected to the output unit 27, images indicating the individual parameters determined as participating in the battle on the basis of the hit points changed in step S15 or the parameters for the individual characters.

In step S17, the parameter determination unit 212 determines whether or not a battle termination condition is satisfied.

In the case where the battle termination condition is satisfied, the determination in step S17 results in Yes, and the battle execution process is terminated. Meanwhile, in the case where the battle termination condition is not satisfied, the determination in step S17 results in No, and the process proceeds to step S18.

In step S18, the parameter determination unit 212 determines whether a number-of-characters condition is satisfied.

In the case where the number-of-characters condition is satisfied, the determination in step S18 results in Yes, and the process proceeds to step S19. Meanwhile, in the case where the number-of-characters condition is not satisfied, the determination in step S18 results in No, and the process proceeds to step S13. Then, the processing in and after step S13, which is iterative processing, is iterated again.

In step S19, display control unit 213 changes the display mode of the parameters, such as the hit points, displayed on the display connected to the output unit 27. Then, the process proceeds to step S13. Then, the processing in and after step S13, which is iterative processing, is iterated again.

With the battle execution process described above, in this embodiment, when a battle is played between a plurality of character groups, the parameter display mode for each character is changed in accordance with increases or decreases in the number of characters in the battle included in at least one of the character groups.

Accordingly, in the embodiment of the present invention, parameters for each character during a battle can be displayed more suitably compared with ordinary technologies, which do not involve such changes in the display mode.

Third Embodiment

Next, a third embodiment of the present invention will be described. This embodiment is realized in the form of a client-server system in which the functionality of the information processing device 1 in the first embodiment is realized in a form distributed to the player terminal 2 and the server 3. In the third embodiment more functions are realized by the server 3b compared with the second embodiment. Thus, in the third embodiment, it is possible to reduce processing by the player terminal 2b.

Repeated descriptions of parts that are common to those in the first embodiment and second embodiment described above will be omitted as appropriate, and parts that differ from those in the first embodiment and second embodiment described above will be described in detail. For example, the second embodiment and the third embodiment have the same hardware configuration, as mentioned earlier, and thus, a repeated description thereof will be omitted.

[Functional Configuration]

Figure 11:
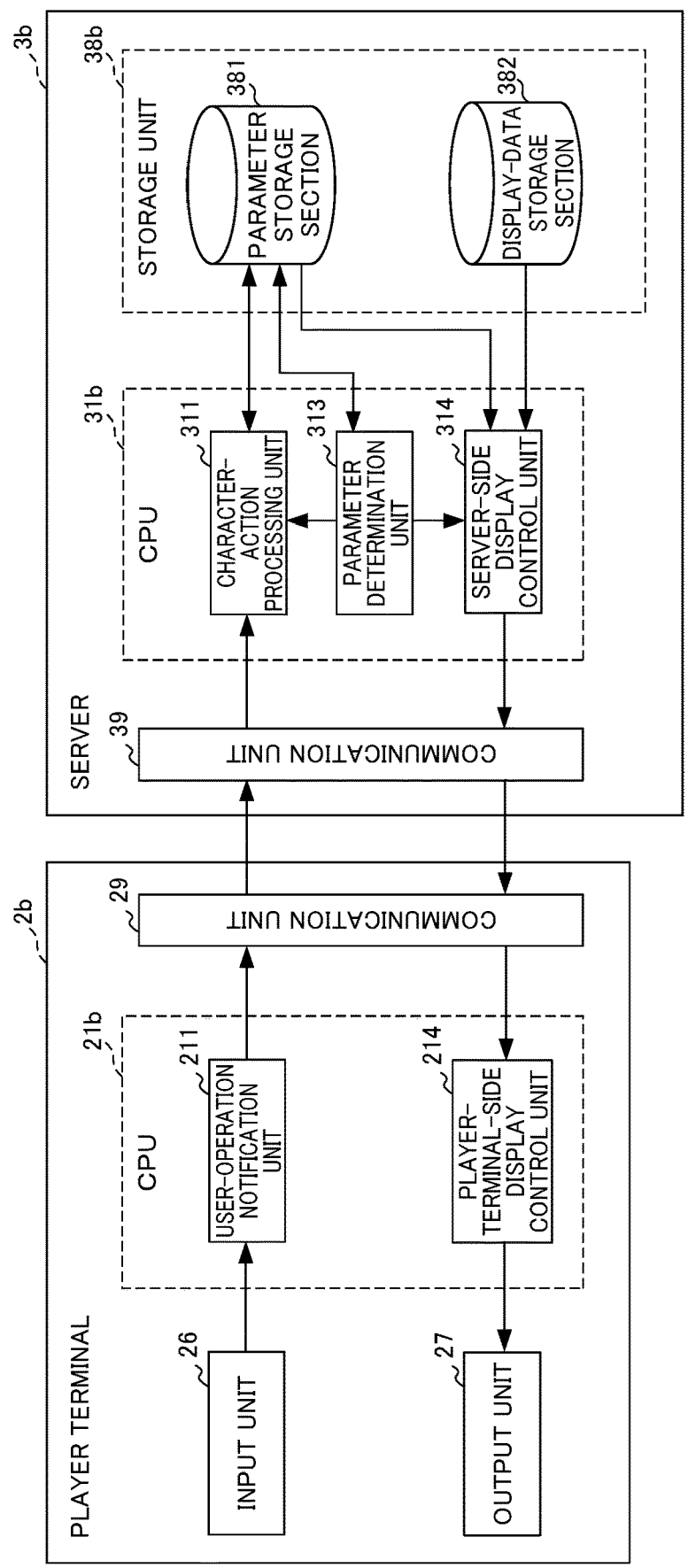
FIG. 11 is a functional block diagram showing the functional configuration for executing a battle execution process in the third embodiment in the functional configuration of the player terminal and the server in FIG. 8.

FIG. 11 is a functional block diagram showing the functional configuration for executing a battle execution process in the functional configuration of the player terminal 2 and the server 3 in FIG. 8.

When the battle execution process is executed, as shown in FIG. 11, the CPU 21b functions as a player-operation notification unit 211 and a player-terminal-side display control unit 214.

Furthermore, the CPU 31b functions as a character-action processing unit 311, a parameter determination unit 313, and a server-side display control unit 314. Furthermore, a parameter storage section 381 and a display-data storage section 382 are set in an area of the storage unit 38b.

Here, the functional blocks other than the player-operation notification unit 211, the player-terminal-side display control unit 214, and the server-side display control unit 314, as well as the individual storage units, have functions that are equivalent to the functions of the functional blocks having the same names with different reference signs, included in the information processing device 1 described with reference to FIG. 2, and thus, repeated descriptions thereof will be omitted.

Similarly to the second embodiment, the player-operation notification unit 211 is a unit that sends an action instruction input by the player via the input unit 26 to the character-action processing unit 311 of the server 3*b* via the communication unit 29.

The server-side display control unit 314 and the player-terminal-side display control unit 214 are parts that cooperate with each other to realize display control similarly to the display control unit 113. Specifically, the server-side display control unit 314 generates image data for performing display on the display connected to the output unit 27 on the basis of the latest values of the parameters stored in the parameter storage section 381 and the display data stored in the display-data storage section. Then, the server-side display control unit 314 sends the generated image data to the server 3*b* via the communication unit 29.

The player-terminal-side display control unit 214 receives this image data and executes control for performing display on the display connected to the output unit 27.

[Operation]

Next, a battle execution process that is executed by these functional blocks will be described with reference to FIG. 12.

Figure 12:
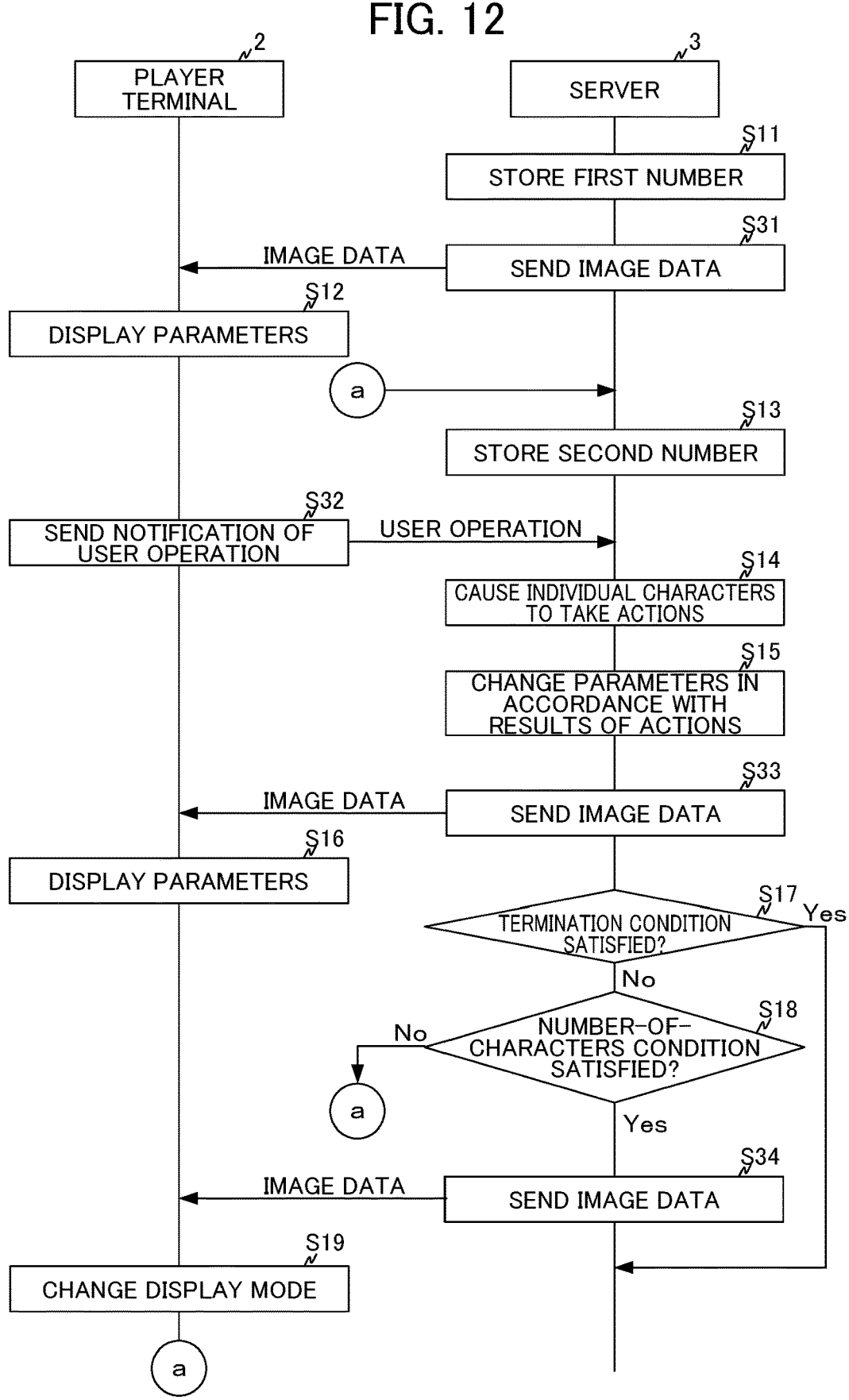
FIG. 12 is a sequence chart for explaining the flow of the battle execution process in the third embodiment, which is executed by the player terminal and the server in FIG. 8, having the functional configuration in FIG. 11.

FIG. 12 is a flowchart for explaining the flow of the battle execution process that is executed by the player terminal 2*b* and the server 3*b* in FIG. 8, having the functional configuration in FIG. 11. The battle execution process is executed when a battle is played between enemy characters and ally characters in a game that is executed on the player terminal 2*b* and the server 3*b*. It is assumed that the battle is played between an ally character group including at least one ally character and an enemy character group including a plurality of enemy characters.

In FIG. 12, steps having the same content as those in the flowchart in FIG. 3 are designated by the same reference signs (e.g., "S1"). Furthermore, repeated descriptions of the steps having the same content as those in the flowchart in FIG. 3 will be omitted to simplify the description.

In step S11, the parameter determination unit 313 stores a first number.

In step S31, the server-side display control unit 314 generates image data for performing display on the display connected to the output unit 27 on the basis of the latest values of the parameters stored in the parameter storage section 381 and the display data stored in the display-data storage section 382. Then, the server-side display control unit 314 sends the generated image data to the server 3*b* via the communication unit 29.

In step S12, the player-terminal-side display control unit 214 executes control to display images indicating the individual characters or the parameters for the individual characters on the display connected to the output unit 27 on the basis of the image data received from the server-side display control unit 314.

In step S13, the parameter determination unit 313 stores a second number.

In step S32, the player-operation notification unit 211 sends an action instruction input by the player via the input unit 26 to the server 3*b* via the communication unit 29.

In step S14, the character-action processing unit 311 causes an ally character to take an action in accordance with the action instruction received from the player terminal 2*b* or a predetermined condition. Furthermore, the character-action processing unit 311 causes the enemy characters to take actions mutually with the ally characters.

In step S15, the character-action processing unit 311 changes the parameters for the individual characters, including the hit points, in accordance with the individual actions of the characters. Furthermore, the character-action processing unit 311 updates the latest values of the parameters stored in the parameter storage section 381 on the basis of the changed parameters.

In step S33, the server-side display control unit 314 generates image data for performing display on the display connected to the output unit 27 on the basis of the latest values of the parameters stored in the parameter storage section 381, updated in step S15, and the display data stored in the display data storage section 382. Then, the server-side display control unit 314 sends the generated image data to the server 3*b* via the communication unit 29.

In step S16, the player-terminal-side display control unit 214 executes control to display images indicating the individual characters and the parameters for the individual characters on the display connected to the output unit 27 on the basis of the image data received from the server-side display control unit 314.

In step S17, the parameter determination unit 313 determines whether or not a battle termination condition is satisfied.

In the case where the battle termination condition is satisfied, the determination in step S17 results in Yes, and the battle execution process is terminated. Meanwhile, in the case where the battle termination condition is not satisfied, the determination in step S17 results in No, and the process proceeds to step S18.

In step S18, the parameter determination unit 313 determines whether or not a number-of-characters condition is satisfied.

In the case where the number-of-characters condition is satisfied, the determination in step S18 results in Yes, and the process proceeds to step S33. Meanwhile, in the case where the number-of-characters condition is not satisfied, the determination in step S18 results in No, and the process proceeds to step S13. Then, the processing in and after step S13, which is iterative processing, is iterated again.

In step S33, the server-side display control unit 314 generates image data for changing the display mode of the parameters displayed on the display connected to the output unit 27, such as the hit points. Then, the server-side display control unit 314 sends the generated image data to the server 3*b* via the communication unit 29.

In step S19, the player-terminal-side display control unit 214 receives this image data and executes control to perform display on the display connected to the output unit 27.

Then, the process proceeds to step S13. Then, the processing in and after step S13, which is iterative processing, is iterated again.

With the battle execution process described above, in this embodiment, when a battle is played between a plurality of character groups, the parameter display mode for each character is changed in accordance with increases or decreases in the number of characters in the battle included in at least one of the character groups.

Accordingly, in the embodiment of the present invention, parameters for each character during a battle can be displayed more suitably compared with ordinary technologies, which do not involve such changes in the display mode.

Three embodiments of the present invention have been described above. Note, however, that the present invention is not limited to the embodiments described above and that the present invention encompasses modifications, improvements, etc. within a scope in which it is possible to achieve the object of the present invention.

That is, the present invention is widely applicable to information processing devices that output various kinds of information, such as parameters, in a form that is recognizable by a player.

Furthermore, although the above embodiments have been described in the context of examples where the information processing device 1 or the player terminal 2 to which the present invention is applied is a game machine or a smartphone, there is no particular limitation to these examples. The present invention is applicable to electronic appliances having information processing functions in general.

Furthermore, the series of processing steps described above can be executed by hardware or by software.

In other words, the functional configurations shown in FIGS. 2, 9, and 11 are only examples, and there is no particular limitation thereto. That is, it suffices to provide the information processing device 1, the player terminal 2, or the server 3 with functions that make it possible to execute the series of processing steps described above as a whole, and the choice of specific functional blocks for realizing those functions is not limited to that in the examples in FIGS. 2, 9, and 11.

Furthermore, each functional block may be implemented by hardware alone, by software alone, or by a combination of hardware and software.

The functional configurations in the embodiments are realized by using a processor that executes computational processing. Processors that can be used in the embodiments include a processor constituted of only an information processing device of various kinds, such as a single processor, a multiprocessor, or a multicore processor, as well as a combination of one of these various kinds of processing device and a processing circuit such as an application specific integrated circuit (ASIC) or a field-programmable gate array (FPGA).

In the case where the series of processing steps is executed by software, a program constituting the software is installed in a computer or the like from a network or a recording medium.

The computer may be a computer embedded in special hardware. Alternatively, the computer may be a computer that is capable of executing various functions when various programs are installed therein, such as a general-purpose personal computer.

A recording medium including such a program is implemented by the removable medium 100 in FIG. 1 or FIG. 8, which is distributed separately from the main unit of a device in order to provide the player with the program, or is implemented by a recording medium or the like that is provided to a player in a state embedded in advance in the main unit of a device. The removable medium 100 is implemented, for example, by a magnetic disk (including a floppy disk), an optical disk, or a magneto-optical disk. The optical disk is implemented, for example, by a compact disk-read only memory (CD-ROM), a digital versatile disk (DVD), or a Blu-ray (registered trademark) disc. The magneto-optical disk is implemented, for example, by a mini-disk (MD). Furthermore, the recording medium that is provided to a player in a state embedded in advance in the main unit of a device is implemented, for example, by the ROM 12 in FIG. 1, in which a program is recorded, or a semiconductor memory included in the storage unit 18 in FIG. 1.

In this description, steps defining the program recorded in the recording medium may include processing that is not necessarily executed sequentially but is executed in parallel or individually, as well as processing that is executed sequentially in order. Furthermore, steps that are executed according to the program recorded in the recording medium may be executed in an arbitrary order within a scope not departing from the spirit of the present invention.

Although three embodiments of the present invention have been described above, these three embodiments are only examples and do not limit the technical scope of the present invention. The present invention can be embodied in various other forms, and it is also possible to make various modifications, such as omission and substitution, without departing from the spirit of the present invention. These embodiments and modifications are encompassed in the scope and spirit of the invention disclosed in this description, etc. and are encompassed in the scope of the invention recited in claims, and equivalents thereof.

First Modification

In the embodiments described above, three conditions, namely, the first condition, the second condition, and the third condition, described earlier, are given as examples of a number-of-characters condition, and it is described that these conditions may be combined; however, there is no limitation thereto.

For example, the third condition described earlier is easily satisfied, and thus, changes in the display mode frequently occur if the third condition is used as a number-of-characters condition. In this case, there are players who do not like frequent display changes on a small screen of a smartphone or the like. In such cases, for the purpose of minimizing the number of times that display processing is executed, it is possible not to use the third condition as a number-of-characters condition.

Second Modification

In the case of a client-server system in particular, as in the second embodiment or the third embodiment, there may be cases where a connection for communication fails because of congestion of the circuit between the player terminal 2 and the server 3 or a failure of the player terminal 2 to suitably send and receive radio waves for communication. In such cases, the player terminal 2 may attempt to reconnect to the server 3 (reloading) automatically or in response to a player's operation. In this case, for example, the iterative processing starting from step S13 may be executed again after the reconnection.

Furthermore, in this case, there is a possibility that the second number is not successfully stored in the iterative processing at the time of the previous connection. Thus, at the time of reconnection, determination should be performed by using the second condition, which is a condition involving the first number, as a number-of-characters condition instead of using the first condition, which is a condition involving the second number, as a number-of-characters condition. Furthermore, in this case, since there is a possibility that the determination as to whether or not the number-of-characters condition is satisfied (corresponding to step S18) and a change in the display mode in the case where the number-of-characters condition is satisfied (corresponding to step S19) are not suitably performed in the iterative processing at the time of the previous connection, step S18 and step S19 may be performed before executing step S13 at the time of reconnection.

Third Modification

Although the display mode for displaying the parameters for enemy characters is changed in the embodiments described above, the invention is not limited thereto, the display mode for displaying the parameters for ally characters may be changed. Furthermore, the display modes for displaying the parameters for both enemy characters and ally characters may be changed.

EXPLANATION OF REFERENCE NUMERALS

1 Information processing device
2 Player terminal
3 Server
11, 21, 31 CPU
12, 22, 32 ROM
13, 23, 33 RAM
14, 24, 34 Bus
15, 25, 35 Input/output interface
16, 26, 36 Input unit
17, 27, 37 Output unit
18, 28, 38 Storage unit
29, 39 Communication unit
19, 30, 40 Drive
100 Removable medium
111, 311 Character-action processing unit
112, 212, 313 Parameter determination unit
113, 213 Display control unit
181, 381 Parameter storage section
182, 281, 382 Display-data storage section
211 Player-operation notification unit
214 Player-terminal-side display control unit
312 Parameter notification unit
314 Server-side display control unit

The invention claimed is:

1. A non-transitory computer readable medium storing an information processing program for causing a computer to execute a method, the method comprising:
   executing control, when a battle by a first character group including a first character and a second character group including a plurality of second characters is started, to display display target parameters for the plurality of second characters on a display medium, and storing a first number, which is a number of the plurality of second characters;
   storing a second number, which is a number of the plurality of second characters determined as participating in the battle based on determination parameters, which are parameters for determining whether or not to permit participation in the battle, in an iterative processing that is iterated during the battle;
   causing at least one of the first character group and the second character group to take an action in accordance with an action instruction input by a player or a predetermined condition in the iterative processing;
   changing the determination parameters in accordance with individual actions of the first character or the plurality of second characters in the iterative processing;
   executing control to display, on the display medium, display target parameters for the plurality of second characters that are determined as participating in the battle based on the determination parameters in the iterative processing; and
   executing control to change a display mode of the display target parameters on the display medium in accordance with a condition regarding at least one of the first number and the second number in the iterative processing,
   wherein the iterative processing is continued by iteratively performing the method in a predetermined order until the determination parameter for each character included in the first character group or each character included in the second character group satisfies a battle termination condition, and the iterative processing is terminated when the predetermined condition is satisfied.

2. The non-transitory computer readable medium storing an information processing program according to claim 1, wherein the condition regarding at least one of the first number and the second number is that the second number has increased or decreased compared with the first number.

3. The non-transitory computer readable medium storing an information processing program according to claim 1, wherein the condition regarding at least one of the first number and the second number is that the second number in the iterative processing currently being executed has increased or decreased compared with the second number in the iterative processing executed in a preceding iteration.

4. The non-transitory computer readable medium storing an information processing program according to claim 1, wherein the determination parameters are displayed as the display target parameters.

5. The non-transitory computer readable medium storing an information processing program according to claim 1, wherein a change in the display mode is realized by executing enlargement processing or reduction processing on a display material that is used to display the display target parameters.

6. The non-transitory computer readable medium storing an information processing program according to claim 1, wherein a change in the display mode is realized by switching a display material that is used to display the display target parameters from a first display material, which is currently being used, to a second display material, which has a different size from the first display material when displayed.

7. The non-transitory computer readable medium storing an information processing program according to claim 1, wherein a change in the display mode is realized by increasing or decreasing one of or both the number of kinds of the display target parameters that are displayed for a single character and the number of items that are displayed for a single kind of the display target parameter that is displayed for a single character.

8. An information processing system including a terminal and a server that is communicatively connected to the terminal, the terminal configured for:
   executing control, when a battle by a first character group including a first character and a second character group including a plurality of second characters is started, to display display target parameters for the plurality of second characters on a display medium, and storing a first number, which is a number of the plurality of second characters;
   storing a second number, which is a number of the plurality of second characters determined as participating in the battle based on determination parameters received from the server, which are parameters for determining whether or not to permit participation in the battle, in an iterative processing that is iterated during the battle;

executing control to display, on the display medium, display target parameters for second characters determined as participating in the battle based on the determination parameters received from the server;

executing control to change a display mode of the display target parameters on the display medium in accordance with a condition regarding the first number and the second number in the iterative processing; and accepting an action instruction input by a player and sending the accepted action instruction to the server, and the server configured for:

sending the determination parameters to the terminal when the battle is started and in the iterative processing;

causing at least one of the first character group and the second character group to take an action in accordance with an action instruction received from the terminal or a predetermined condition in the iterative processing; and changing the determination parameters in accordance with individual actions of the first character or the plurality of second characters in the iterative processing, wherein the iterative processing is continued by iteratively operating in a predetermined order until the determination parameter for each character included in the first character group or each character included in the second character group satisfies a battle termination condition, and the iterative processing is terminated when the predetermined condition is satisfied.

9. A server that is communicatively connected to a terminal having a function for controlling display on a display medium, the server configured for:

executing control, when a battle by a first character group including a first character and a second character group including a plurality of second characters is started, to display display target parameters for the plurality of second characters on a display medium, and storing a first number, which is a number of the plurality of second characters;

storing a second number, which is a number of the plurality of second characters determined as participating in the battle based on determination parameters, which are parameters for determining whether or not to permit participation in the battle, in an iterative processing that is iterated during the battle;

causing at least one of the first character group and the second character group to take an action in accordance with an action instruction input by a player or a predetermined condition in the iterative processing;

changing the determination parameters in accordance with individual actions of the first character or the plurality of second characters in the iterative processing;

instructing the terminal to execute control so as to display, on the display medium, display target parameters for second characters determined as participating in the battle based on the determination parameters in the iterative processing; and executing control to change a display mode of the display target parameters on the display medium in accordance with a condition regarding at least one of the first number and the second number in the iterative processing, wherein the iterative processing is continued by operating in a predetermined order until the determination parameter for each character included in the first character group or each character included in the second character group satisfies a battle termination condition, and the iterative processing is terminated when the predetermined condition is satisfied.

* * * * *